United States Patent
Ohta et al.

[11] Patent Number: 6,145,886
[45] Date of Patent: Nov. 14, 2000

[54] PIPE CONNECTOR CONNECTION CHECKING ASSEMBLY

[75] Inventors: Atsushi Ohta; Yasunobu Endou, both of Wako; Hideki Kimura, Koga, all of Japan

[73] Assignees: Honda Giken Kogyo Kabushiki Kaisha, Tokyo; Sanoh Kogyo Kabushiki Kaisha, Ibaraki-ken, both of Japan

[21] Appl. No.: 09/182,534

[22] Filed: Oct. 29, 1998

[30] Foreign Application Priority Data

Oct. 31, 1997 [JP] Japan ................................. 9-299827
Feb. 17, 1998 [JP] Japan ................................. 10-034601

[51] Int. Cl.$^7$ ................................................. F16L 35/00
[52] U.S. Cl. .............................. 285/4; 285/93; 285/305; 285/38
[58] Field of Search .................... 285/305, 319, 285/38, 4, 93, 3

[56] References Cited

U.S. PATENT DOCUMENTS

| | | | |
|---|---|---|---|
| D. 398,819 | 9/1998 | Kondou ................................. | D8/14 |
| 5,152,555 | 10/1992 | Szabo ................................. | 285/305 |
| 5,342,099 | 8/1994 | Bahner et al. ......................... | 285/93 |
| 5,366,259 | 11/1994 | Hohmann et al. ...................... | 285/305 |
| 5,586,792 | 12/1996 | Kalahasthy et al. ................... | 285/305 |
| 5,593,187 | 1/1997 | Okuda et al. .......................... | 285/305 |
| 5,607,192 | 3/1997 | Lee ..................................... | 285/305 |
| 5,863,077 | 1/1999 | Szabo et al. .......................... | 285/3 |
| 5,897,145 | 4/1999 | Knodo et al. ......................... | 285/38 |

FOREIGN PATENT DOCUMENTS

| | | | |
|---|---|---|---|
| 3-17115 | 4/1991 | Japan . | |
| 902447 | 8/1962 | United Kingdom ................... | 285/305 |

*Primary Examiner*—Lynne H. Browne
*Assistant Examiner*—Tomlyne A Malcolm
*Attorney, Agent, or Firm*—Alston & Bird LLP

[57] ABSTRACT

There is provided a pipe connector connection checking assembly in which it can surely be checked that a male connector is incompletely connected with a female connector. A connection checking member is formed with an ear portion for integrally connecting a pair of claws disposed opposingly and a portion having a low strength formed at a portion except the ear portion, and the claws of the connection checking member are inserted into holes in the female connector. When the connection checking member is pulled outward in the state in which the male connector is incompletely inserted into the female connector, the portion having a low strength is broken before the engagement of the claws is released.

8 Claims, 4 Drawing Sheets

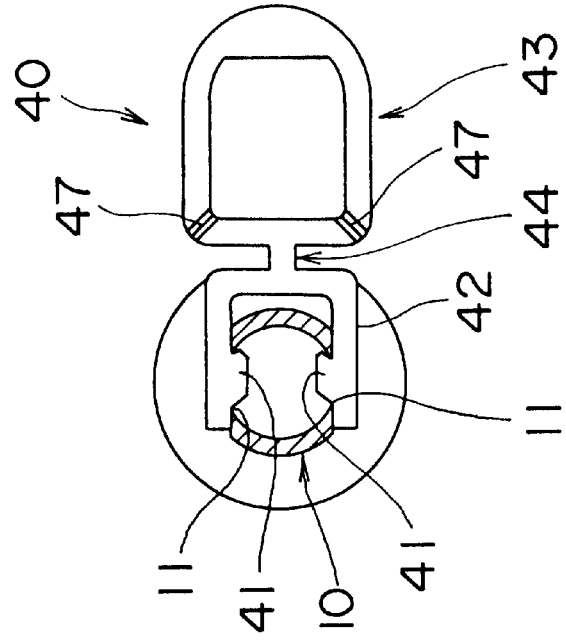
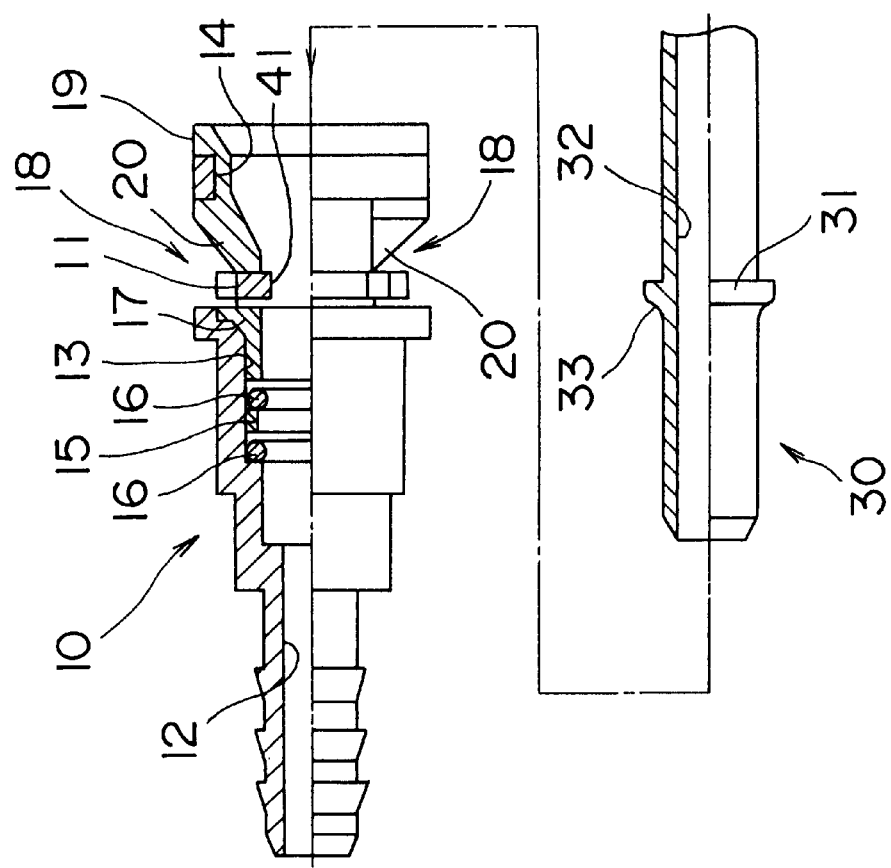
FIG. 1(a)
FIG. 1(b)

PIPE CONNECTOR CONNECTION CHECKING ASSEMBLY

BACKGROUND OF THE INVENTION AND RELATED ART STATEMENT

1. Field of the Invention

The present invention relates to a pipe connector connection checking assembly. More particularly, the present invention relates to a pipe connector connection checking assembly in which a connection checking member can be removed when a male connector is fully inserted into a female connector, and the connecting state of connectors is checked by examining whether the connection checking member can be removed or not.

2. Description of Related Art

There is publicly known a pipe connector connection checking assembly in which a connection checking member can be removed when a male connector is fully inserted into a female connector, and the connecting state of connectors is checked by examining whether the connection checking member can be removed or not (for example, Japanese Utility Model Publication No. 3-17115 (No. 17115/1991)).

Such a pipe connector connection checking assembly includes a male connector having a flange, a female connector having holes at a position which agrees with the flange when the male connector is fully connected to the female connector, and a connection checking member having a pair of claws urged in the narrowing direction, in which the claws are inserted into the holes in the female connector when being mounted to the female connector. When the connecting state is checked, the claws of the connection checking member have been inserted into and engaged with the holes in the female connector in advance.

In this pipe connector connection checking assembly, when the male connector is fully inserted into the female connector, the claws of the connection checking member are pushed and opened by the flange of the male connector, so that the engagement of the claws with the female connector is released. Therefore, if the connection checking member is pulled outward, the connection checking member is separated easily from the female connector, whereby it is checked that the male connector is fully inserted into the female connector. Also, when the male connector is incompletely inserted into the female connector, the claws of the connection checking member are kept in a state of being engaged with the female connector. Therefore, even if the connection checking member is pulled outward, the connection checking member is not separated, whereby it is checked that the male connector is incompletely connected to the female connector.

OBJECT AND SUMMARY OF THE INVENTION

In the aforementioned pipe connector connection checking assembly, if the connection checking member is pulled with a strong force, the connection checking member is sometimes broken, or the claw is sometimes broken, so that the connection checking member is released from the female connector. In such a case, there is a possibility that the male connector may be mistakenly taken to be fully inserted into the female connector.

Accordingly, an object of the present invention is to provide a pipe connector connection checking assembly in which it can surely be checked particularly that a male connector is incompletely connected with a female connector.

To achieve the above object, the present invention provides a pipe connector connection checking assembly comprising: a male connector having a flange; a female connector having holes at a position which agrees with the flange when the male connector is fully connected; and a connection checking member having a pair of claws urged in the narrowing direction, in which the claws are inserted into the holes in the female connector when being mounted to the female connector, wherein the claws of the connection checking member are inserted into and engaged with the holes in the female connector, and when the male connector is fully inserted into the female connector, the claws of the connection checking member are pushed and opened by the flange of the male connector, and the engagement of the claws with the female connector is released, so that the connection checking member can be separated from the female connector when the connection checking member is pulled outward, and when the male connector is incompletely inserted into the female connector, the claws of the connection checking member are kept in a state of being engaged with the female connector, so that the connection checking member is not released from the female connector even if the connection checking member is pulled outward, by which the connecting state of the pipe connectors is checked, characterized in that the connection checking member is formed with an ear portion for integrally connecting the claws, and a portion having a low strength is formed at a portion except the ear portion, so that when the connection checking member is pulled outward in the state in which the male connector is incompletely inserted into the female connector, the portion having a low strength is broken before the engagement of the claws is released.

In the pipe connector connection checking assembly in accordance with the present invention, even when the connection checking member is pulled strongly, the portion having a low strength is broken, and the claws remain on the female connector, whereby the incomplete connection of the connectors is checked.

Also, in the pipe connector connection checking assembly in accordance with the present invention, the portion having a low strength is formed by a notch.

In the pipe connector connection checking assembly in accordance with the present invention, since the portion having a low strength is formed by a notch, the breaking strength can be set with relatively high accuracy.

Further, in the pipe connector connection checking assembly in accordance with the present invention, a handle portion is formed which has a portion for applying a pulling external force to the connection checking member, and the handle portion and the ear portion are connected with each other by a neck portion, by which the twisting of the handle portion is absorbed by the neck portion when the handle portion is twisted with respect to the ear portion.

In the pipe connector connection checking assembly in accordance with the present invention, even if the handle portion is turned with respect to the ear portion, the displacement is absorbed by the neck portion, so that the ear portion is not twisted. Therefore, there is no possibility that the claws are released from the female connector.

BRIEF DESCRIPTION OF THE DRAWINGS

FIG. 1(*a*) is a semi-sectional view showing the whole of a pipe connector connection checking assembly in accordance with the present invention, and FIG. 1(*b*) is a sectional view showing a state in which a connection checking member is mounted to a female connector;

FIG. 3 is a view for illustrating the operation of a connection checking member for a pipe connector connection checking assembly in accordance with the present invention;

DETAILED DESCRIPTION OF PREFERRED EMBODIMENTS

Figure 2:
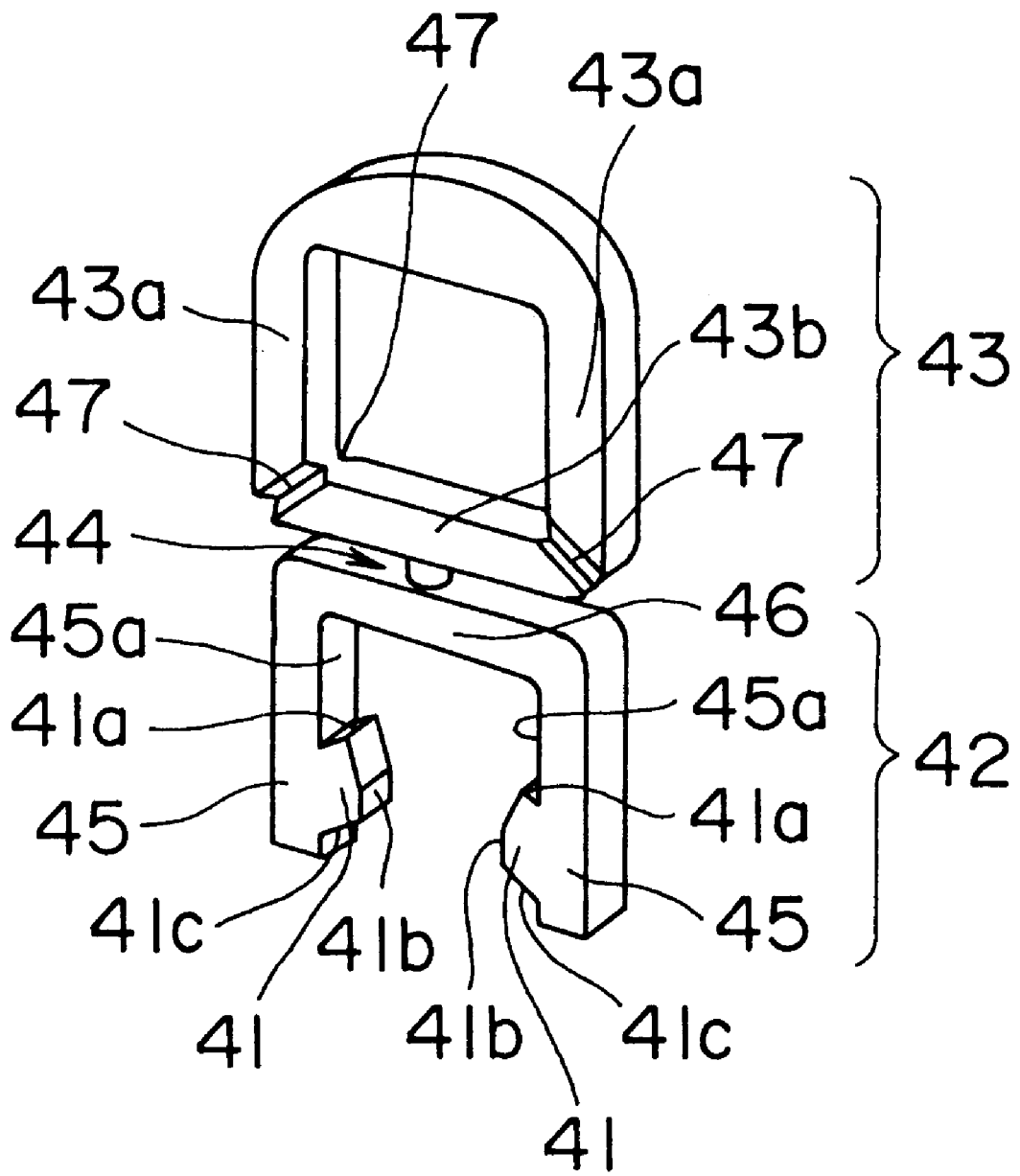
FIG. 2 is a perspective view of a connection checking member for a pipe connector connection checking assembly in accordance with the present invention.

FIG. 1 shows one embodiment of a pipe connector connection checking assembly in accordance with the present invention. This pipe connector connection checking assembly includes a female connector 10 having holes 11 at opposed positions on the peripheral wall, a male connector 30 formed with a flange 31 at a position which agrees with the holes 11 when being fully connected to the female connector 10, and a connection checking member 40 having a pair of claws 41 urged in the narrowing direction, in which the claws 41 are inserted into the holes 11 in the female connector 10.

As shown in FIG. 1(a), the female connector 10 has, at one end thereof, a seal ring housing portion 13 with a diameter larger than the diameter of a passage 12 and a flange housing portion 14 with a diameter larger than the diameter of the seal ring housing portion 13. The seal ring housing portion 13 is packed with two O-rings 16 holding a spacer 15 between them, and these elements are restrained in the seal ring housing portion 13 by a stopper 17 mounted at the boundary between the seal ring housing portion 13 and the flange housing portion 14. Also, the opposed portions of a peripheral wall defining the flange housing portion 14 are formed with windows 18. At one end of the connector 10, there is fitted an annular body 19 formed of a hard elastic plastic or the like material. This annular body 19 has a claw 20 at the tip end, and the base end of the claw 20 is engaged with a one end side wall defining the window 18. The hole 11 is formed between the wall on the side of the seal ring housing portion, defining the window 18, and the claw 20.

The male connector 30 has a passage 32 with a diameter approximately equal to the diameter of the passage 12 of the female connector 10 as shown in FIG. 1(a). The base portion on the tip end side of the flange 31 on the male connector 30 has a guide face 33 formed by a slant surface or an arc.

As shown in FIGS. 1(b) and 2, the connection checking member 40 is made up of an ear portion 42 having a pair of claws 41, a handle portion 43 having a substantially rectangular ring shape, and a neck portion 44 for connecting the handle portion 43 with the ear portion 42. These portions 42, 43 and 44 are integrally molded from a hard elastic plastic or the like material. The ear portion 42 is formed into a U shape, and a claw 41 is formed on the inside face 45a of a leg portion 45 thereof. For the claw 41, a face 41a on the side of a top portion 46 defining the U shape is formed so as to make an acute angle with respect to the inside face 45a of the leg portion 45, and a face 41b protruding innermostly is formed substantially in parallel to the inside face 45a of the leg portion 45. The handle portion 43 is formed with notches 47 on the obverse surface and the back surface at the boundary between a side portion 43a and a bottom portion 43b. This notch 47 forms a portion having a low strength by decreasing the wall thickness of that portion so that stresses are concentrated at the portion by forming an angle at the deepest portion of the notch 47 or forming an arc with a very small radius of curvature (R). Also, the neck portion is formed into a circle in horizontal cross section.

Figure 3A:
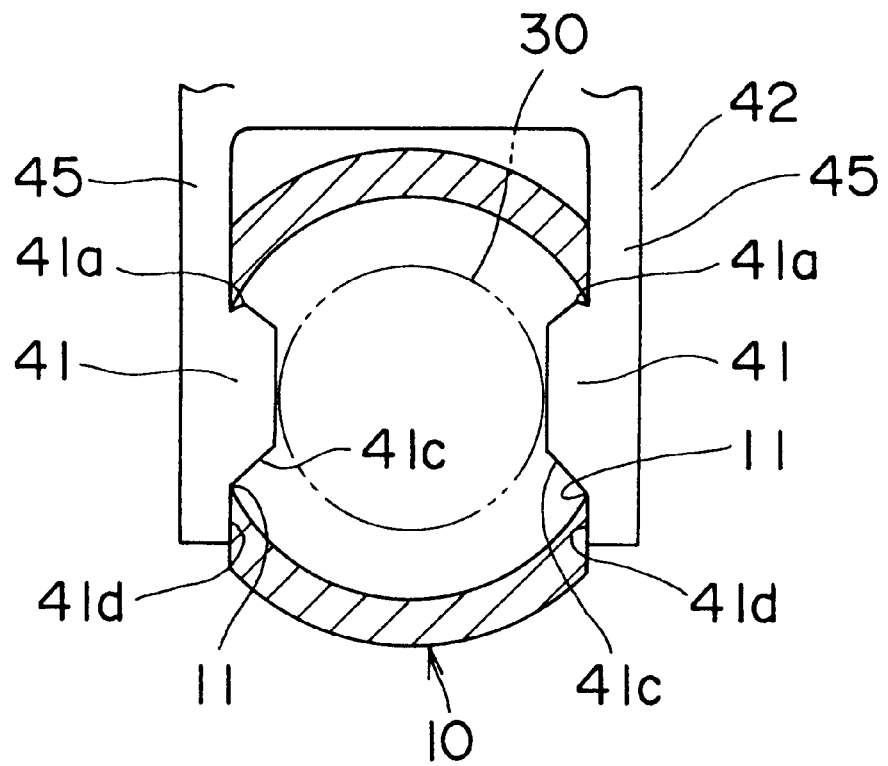
FIG. 3(a) is an enlarged sectional view of a principal portion in a state in which a male connector is not inserted into a female connector.

The pipe connector connection checking assembly thus configured is used as follows: First, the opening of the ear portion 42 is fitted toward the holes 11 in the female connector 10. Then, the leg portion 45 advances while being pushed and opened by being guided by opening side slant faces 41c of the claws 41, and the claws 41 are fitted into the holes 11 in the female connector 10. In this state, as shown in FIG. 3(a), the face 41a of the claw 41 engages with the edge of the hole 11, so that even if the connection checking member 40 is pulled upward in the figure, the claw is not released from the female connector 10. Also, an inside face 41d at the free end of the leg portion 45 restrains an inward displacement of the claw 41 by coming into contact with the periphery of the hole 11 so that the claw does not obstruct the way when the male connector 30 is inserted into the female connector 10.

Figure 3B:
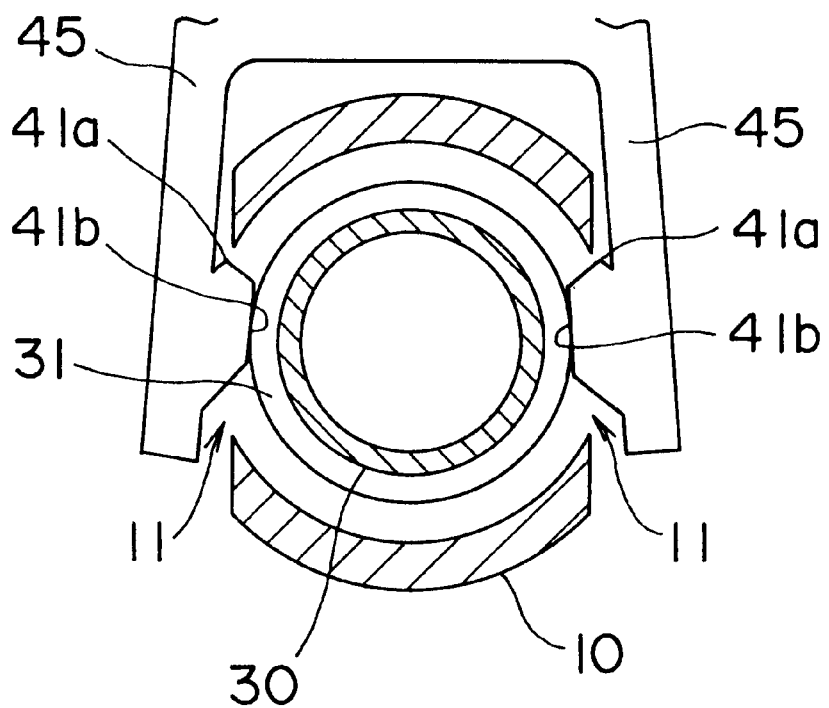
FIG. 3(b) is an enlarged sectional view of a principal portion in a state in which the male connector is fully connected to the female connector.

When the male connector 30 is inserted into the female connector 10 in this state, the flange 31 reaches the holes 11 in the female connector 10 while the guide face 33 (see FIG. 1) of the flange 31 pushes and opens the claws 41, by which the male connector 30 is fully connected with the female connector 10. When the male connector 30 is fully connected with the female connector 10, as shown in FIG. 3(b), the flange 31 comes into contact with the faces 41b of the claws 41 and pushes outward and opens the claws 41. In this state, the face 41a of the claw 41 gets out of the hole 11 in the female connector 10. Therefore, if the connection checking member 40 is pulled upward in the figure, the claws 41 can easily be released from the holes 11. Thereby, it is checked that the male connector 30 is fully connected with the female connector 10.

If the male connector 30 is not fully connected with the female connector 10 when the male connector 30 is inserted into the female connector 10, the claws 41 of the connection checking member 40 are kept in the state shown in FIG. 3(a). Therefore, even if the connection checking member 40 is pulled upward in the figure, the claws 41 cannot be released from the holes 11. Thereby, it is checked that the male connector 30 is not fully connected with the female connector 10.

Figure 4:
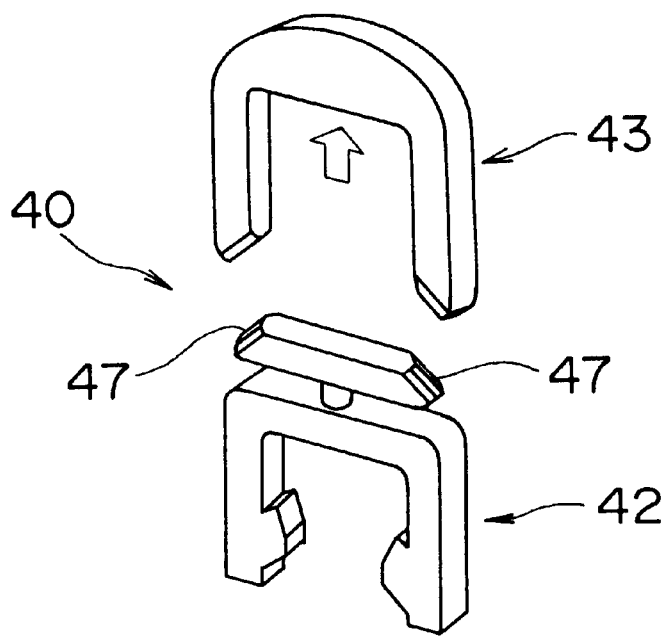
FIG. 4 is a perspective view showing a state in which a connection checking member for a pipe connector connection checking assembly in accordance with the present invention is broken.

If the handle portion 43 is pulled strongly in this state, that is, in the state in which the male connector 30 is not fully connected with the female connector 10, stresses are concentrated at the notches 47 of the handle portion 43, so that the handle portion 43 is torn off at the portions of the notches 47 as shown in FIG. 4. Therefore, the ear portion 42 is left on the female connector 10, so that there remains evidence that the male connector 30 is not fully connected with the female connector 10.

Figure 5:
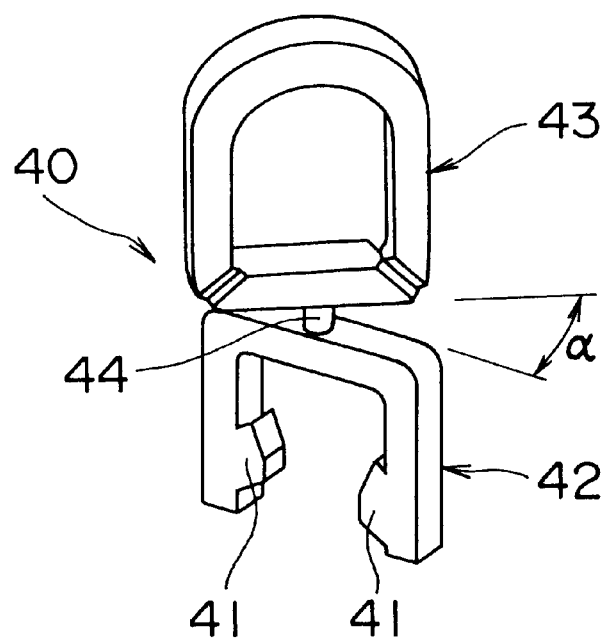
FIG. 5 is a perspective view showing a state in which a handle portion of a connection checking member for a pipe connector connection checking assembly in accordance with the present invention is twisted with respect to an ear portion.

In the above-described embodiment, even if the handle portion 43 is twisted with respect to the ear portion 42 as shown in FIG. 5 when the connection checking member 40 is pulled, the displacement is absorbed by the neck portion 44 and not transmitted to the ear portion 42. Therefore, the claw 41 is not released from the hole 11 in the female connector 10 by the twisting of the ear portion 42.

As is apparent from the above description, the breaking strength of the notch 47 is set so as to be sufficiently higher than a force with which the connection checking member 40 is pulled from the female connector 10 when the male connector 30 is fully connected with the female connector 10, for example, about 1 kgf. Also, it is set so as to be lower than a force with which the ear portion 42 is not broken when the connection checking member 40 is pulled from the female connector 10 in the state in which the male connector 30 is not fully connected with the female connector 10, for example, about 9 kgf, preferably 5 to 8 kgf. Also, the rigidity of the neck portion 44 is preferably such that the displacement of the handle portion 43 is scarcely transmitted to the ear portion 42 when the handle portion 43 is twisted with respect to the ear portion 42 in the range of ±60 degrees by appropriately setting the size and shape of the cross-sectional area of the handle portion 43.

Although the pipe connector connection checking assembly of the present invention has been described with reference to one embodiment, the present invention is not limited to the above-described embodiment, and various modes can be used without departing from the spirit and scope of the following claims. For example, the portion having a low strength is not limited to the boundary between the side portion 43a and the bottom portion 43b of the handle portion 43, and may be any portion except the ear portion 42. Also, the portion having a low strength is not limited to a notch. For example, a portion having a low strength can be formed by using other material having a low strength only at that portion. Alternatively, the handle portion is formed dividedly and the divided portions are bonded to each other by using an adhesive or the like, by which "a portion having a low strength" can be configured at the bonded portion. Further, the neck portion 44 may have a decreased cross-sectional area so that this portion has a lower strength than other portions. Also, although the handle portion 43 is formed into a rectangular ring shape, it may be formed into a tongue shape. Further, if the handle portion 43 itself has a shape, material, or construction such as to absorb the displacement when the handle portion 43 is twisted with respect to the ear portion 42, there is no effect of the twisting of the handle portion 43 on the ear portion 42 even if the neck portion 44 is absent.

As described above, in the pipe connector connection checking assembly in accordance with the present invention, even when the connection checking member is pulled strongly, the portion having a low strength is broken, and the claws remain on the female connector. Thereby, the incomplete connection of connectors can be checked.

What is claimed is:

1. A pipe connector connection checking assembly comprising: a male connector having a flange; a female connector having a peripheral wall which defines holes therein, the holes being located at a position corresponding to a location of the flange when the male connector is fully inserted within the female connector; and a connection checking member adapted to be mounted to the female connector and having a pair of claws urged inwardly such that the claws are inserted into the holes in the female connector when the connection checking member is mounted to the female connector, the claws when fully engaged with the holes in the female connector preventing the connection checking member from being pulled outward to disengage the female connector, and the flange of the male connector being configured to urge the claws outwardly to disengage the holes so as to permit the connection checking member to be disengaged from the female connector when the male connector is fully inserted into the female connector, the connection checking member having an ear portion for integrally connecting the claws, and a portion having a low strength formed at a portion except the ear portion, so that when the connection checking member is pulled outward in a state in which the male connector is incompletely inserted into the female connector, the portion having a low strength is broken before the claws are disengaged from the holes.

2. A pipe connector connection checking assembly according to claim 1, wherein the portion having a low strength is formed by a notch.

3. A pipe connector connection checking assembly according to claim 1, wherein a handle portion is formed which has a portion for applying a pulling external force to the connection checking member, and the handle portion and the ear portion are connected with each other by a neck portion, by which a twisting of the handle portion is absorbed by the neck portion when the handle portion is twisted with respect to the ear portion.

4. A pipe connector connection checking assembly according to claim 3, wherein the portion having a low strength is formed in the handle portion.

5. A pipe connector assembly, comprising:
a female connector having a peripheral wall defining at least one hole therethrough;
a connection checking member adapted to be moved transverse to an axis of the female connector so as to engage the female connector and having a resilient portion defining a claw configured to be resiliently urged inwardly into engagement with the hole in the peripheral wall of the female connector such that the connection checking member is prevented from being pulled transversely to disengage the female connector;
a male connector configured to be inserted into the female connector, the male connector having a flange positioned to be aligned with the hole in the peripheral wall when the male connector is fully inserted into the female connector such that the flange urges the claw outwardly to permit the connection checking member to be disengaged from the female connector; and
a handle portion connected to the connection checking member by a breakable element arranged such that a pulling force exerted transversely on the connection checking member for disengaging the connection checking member from the female connector is applied through the breakable element, the breakable element having a lower strength than the claw such that the breakable element breaks before the claw when the male connector is not fully inserted into the female connector.

6. The pipe connector assembly of claim 5, wherein the connection checking member comprises a generally U-shaped element having a pair of spaced-apart legs adapted to engage opposite sides of the female connector, one of the legs defining the claw.

7. The pipe connector assembly of claim 6, wherein the peripheral wall of the female connector defines a pair of holes on generally opposite sides of the axis, and wherein each of the legs of the connection checking member defines a claw adapted to engage one of the holes in the female connector.

8. The pipe connector assembly of claim 6, further comprising a neck portion connected between the handle portion and the U-shaped element, the neck portion being adapted to absorb a twisting moment applied to the handle portion about a transverse axis so as to substantially isolate the U-shaped portion from the twisting moment.

* * * * *